(12) United States Patent
Fang et al.

(10) Patent No.: US 9,657,712 B2
(45) Date of Patent: May 23, 2017

(54) WIND POWER STATION WITH WIND CONCENTRATING STRUCTURE

(76) Inventors: Zupeng Fang, Jiangsu (CN); Dan Fang, Jiangsu (CN); Fang Fang, Jiangsu (CN); Yafeng Zhao, Jiangsu (CN)

( * ) Notice: Subject to any disclaimer, the term of this patent is extended or adjusted under 35 U.S.C. 154(b) by 886 days.

(21) Appl. No.: 13/603,446

(22) Filed: Sep. 5, 2012

(65) Prior Publication Data

US 2013/0058759 A1    Mar. 7, 2013

(30) Foreign Application Priority Data

Sep. 5, 2011    (CN) .......................... 2011 1 0259162

(51) Int. Cl.
  *F03D 3/04*    (2006.01)
  *F03D 3/00*    (2006.01)
  *F03D 15/00*   (2016.01)

(52) U.S. Cl.
  CPC ........... *F03D 3/0427* (2013.01); *F03D 3/005* (2013.01); *F03D 15/00* (2016.05); *Y02B 10/30* (2013.01); *Y02E 10/721* (2013.01); *Y02E 10/74* (2013.01)

(58) Field of Classification Search
  CPC ........ F03D 11/045; F03D 3/04; F03D 3/0409; F03D 3/0454; F03D 9/001; F03D 9/002; F03D 9/006; F03D 11/0075; F03D 3/0463; F03D 3/0481; F03D 3/02; F03D 3/049; F05B 2240/13; F05B 2240/912; Y02E 10/722; Y02E 10/728; Y02E 10/74
  See application file for complete search history.

(56) References Cited

U.S. PATENT DOCUMENTS

| | | | | |
|---|---|---|---|---|
| 1,112,203 | A * | 9/1914 | Fandrey | 415/4.4 |
| 4,551,631 | A * | 11/1985 | Trigilio | F03D 3/0409 |
| | | | | 290/1 R |
| 6,666,650 | B1 * | 12/2003 | Themel | 416/200 R |
| 6,749,393 | B2 * | 6/2004 | Sosonkina | 415/4.1 |
| 7,172,386 | B2 * | 2/2007 | Truong | F03D 3/0454 |
| | | | | 290/55 |
| 8,192,140 | B2 * | 6/2012 | Kelaiditis et al. | 415/62 |
| 2007/0018462 | A1 * | 1/2007 | Richards et al. | 290/55 |

(Continued)

FOREIGN PATENT DOCUMENTS

WO    WO 0123757 A1 *    4/2001

*Primary Examiner* — Ninh H Nguyen
(74) *Attorney, Agent, or Firm* — Global IP Services; Tianhua Gu (57) ABSTRACT

A wind power station with wind concentrating structure includes a wind concentrating structure, which includes a multiple of floors and a hollow cylindrical central tower (28) running through the multiple of floors; a concentrated drive shaft assembly (2) is provided at a center point O of the central tower (28) being coaxial with a ground central axis (1) and running through each floor of the central tower (28); a impeller (3) is installed on the concentrated drive shaft assembly (2) in each floor of the central tower, the impeller is a vertical axis impeller or a horizontal axis impeller; two or more sub-buildings are radially provided from a original point which is a center O of the central tower (28), outer walls of the sub-buildings are connected with a outer wall of the central tower (28) to form a speed-increasing type windage with the floor (29), a ceiling cover (13) and a ceiling cover supporting truss (14).

6 Claims, 7 Drawing Sheets

(56) References Cited

U.S. PATENT DOCUMENTS

| | | | |
|---|---|---|---|
| 2008/0112789 A1* | 5/2008 | Kelaiditis | 415/4.1 |
| 2010/0084867 A1* | 4/2010 | Sato | 290/52 |
| 2010/0135766 A1* | 6/2010 | Allaei | 415/1 |
| 2010/0156108 A1* | 6/2010 | Gray | 290/55 |
| 2010/0213719 A1* | 8/2010 | Botan et al. | 290/55 |
| 2010/0247302 A1* | 9/2010 | Suma | 415/182.1 |
| 2010/0308597 A1* | 12/2010 | Gyorgyi | 290/55 |
| 2011/0082005 A1* | 4/2011 | Fox et al. | 475/347 |

\* cited by examiner

J-K Section

Fig. 7

WIND POWER STATION WITH WIND CONCENTRATING STRUCTURE

CROSS REFERENCE TO RELATED PATENT APPLICATION

This application claims the priority of the Chinese patent application No. 201110259162.3 with filing date of Sep. 5, 2011, which application is incorporated herein by reference.

FIELD OF THE INVENTION

The invention relates to two industries of architectural complex construction and wind power generation, in particular relates to high and super-high architectural complex construction.

BACKGROUND OF THE INVENTION

Energy status—The world energy crisis and environmental pollution have reached an extent of extremely urgent; Academician Tan Jiazhen, a famous genetics expert in our country described in a book named *Gene Wealth*: "The world crude oil shortage leads to continuous rising of the crude oil price; within 400 years, human almost used up petrochemical type energy accumulated by the earth for 2.5 billion years—petroleum, coal and natural gas. According to statistics, the fixed numbers of years for mining of the three energies are respectively 40 years, 50 years and 240 years, and human must find new energy sources." On 20 Dec. 2007, *Reference News* reprinted a report of Lianhe Zaobao of Singapore: Professor Yang Zhengning said: "I am a very lucky man . . . now it seems that the relation between China and United States will not be a problem within twenty to thirty years, . . . but it cannot be expected after forty or fifty years, the main reason is that human are facing many complex problems, especially resource problems, energy problems and pollution problems; by then conflicts are intend to exist between the two countries because China and United States influence the world too much."

Current status of the wind power generation device: For the prior wind power generation devices, the impellers are pushed by the natural wind speed directly, the best wind speed probability thereof is about 6~8 m/sec; *New Energy Generation Technology* wrote and published by Wang Changgui and so on in our country in 2003 described that: "Nowadays the power of main wind turbine generator system has risen to 600~700 KW, the generator system of MW grade also has been manufactured; at present 2 MW grade generator system has been manufacturing, and most of them are three-blades horizontal axis." The accumulated installed capacity of wind turbine generator system of our country in 2008 had reached 12,000,000 KW, and the annual growth rate was 120% in 2007. In chapter 1.2 "Modern wind turbine" of *Wind Energy Technology* by Tony Burton from United States, it is described that a 1.5 MW wind turbine needs an impeller (refers to three-blades horizontal axis wind turbine) with diameter greater than 60 m. At present, some countries use high towers (60~80 m) in the wind field by using the principle that the wind speed increases with the height increase, according to above-mentioned book by Wang Changgui, it is described that:" The wind speed is 2 m/sec at 20 m position from the ground, however the wind speed is changed to 7~8 m/sec at 300 m position from the ground after measurement; according to the formula of the change between the height and wind speed, it is calculated that the wind speed at 80 m height position is doubled than the wind speed at 20 m height position.

The domestic design parameters for above-mentioned three-bladed type 1.5 MW generator and speed increaser at present are generally: the rotation speed of the low speed shaft (blade) is 30 r.p.m, the rotation speed of the high speed shaft is 1800 r.p.m, the speed increasing ratio is about 60, so the torque of the low speed shaft is about 48750 kg-m, generally such a moment is realized by 2 stage NGW speed-increasing type planetary transmission, the single stage speed-increasing ratio thereof is about 8; taking the maximum diameter of the general annular gear machine tool in the past as 2 m (now it has been developed to 3~4 m), when the number of teeth is 142, the modulus is about 14 mm, the tooth width B=300 mm, then the peripheral force Ft of a single tooth surface is about 16250 Kg, the basic bending stress of the tooth profile is 4 kg/mm$^2$, this stress is approximate to the license threshold of ordinary materials; however above-mentioned tooth profile parameters only can be met by y51200 gear slotter by few heavy machinery plant; known from aforesaid, for the processing capability of the planetary speed increaser of the present horizontal shaft three-blades wind turbine, gear slotter with inner diameter of 2 m can hardly adapt when the power is above 2000 KW, but the single machine capacity of the fire power generation unit is as high as 600,000 KW, the single machine capacity of the gas turbine for peak shaving of the power system is as high as 120,000 KW, however the energy for the latter two is about to be exhausted. It is clear to be see that people must surpass many conventional concepts, make some discoveries and progresses so as to replace the fire power and gas turbine generation devices with conventional wind power generation devices. Su Dongpo wrote in *Former Fu on Red Cliff*: " . . . only the wind on the river and moon on the mountains are inexhaustible, and are given by the Creator and can be used by all the people . . . ". Our invention is also originated from what Su Dongpo said.

The building construction industry of our country has a great development in relation to wind speed, wind pressure standard, earthquake and seismic fortification, and it is all the more so in Nanjing where we live; tall buildings with various postures and beautiful architectural modelings can be seen everywhere, however the shortage is that all the buildings have no wind concentrating effect described by our inventor and cultural connotation of generation with them; all are the same both home and abroad, but they has been developed by several common features as follows: the first one is as super-high buildings, their outer walls almost are closed glass walls and concentrated central air conditioners are adopted the second one is that they all are built on six floors of podiums. The building design in our country, especially high and super-high building design is very sophisticated, and the standards for wind load also are explicitly stipulated, for example, in Building Structure Load Norms, the national wind pressure distribution map has explicitly stipulated the basic wind pressure Wo value of each region, wherein: Tainan and Taipei is 1.2 KN/m$^2$; Shantou, Jilin and Xiamen is 0.75 KN/m$^2$; Kiamusze, Shenzhen, Zhanjiang and Haikou is 0.7 KN/m$^2$, Shanghai is 0.55 KN/m$^2$; Nanjing is 0.35 KN/m$^2$ and so on; the basic wind speed Vo≈24~44 m/sec, and it's known that the designed basic wind speed of railway bridge in the northwest region of our country $V_o$≈70 m/sec.

About the seismic fortification problem of the buildings, in our country it is stipulated that high buildings are provided with seismic fortification within 6~9 magnitudes; our country is an earthquake country, especially earthquake occurs frequently in the earthquake zone regions from Yunnan, Sichuan, Shaanxi, Shanxi to Tangshan of Hebei province; classic buildings of our country have excellent earthquake-proof structures, such as the wall and rostrum of Tian An Men, Jinian Pavillion of Temple of Heaven, which are not destroyed after hundreds of years; in recent 10 year, many high buildings mansions are built in the national large and medium-sized cities, however their common features are mostly rectangular section and the length of their short sides are always 30 m or even smaller, hence their inertia radiuses of bending resistance and torsion resistance are relatively small and are not beneficial for earthquake resistance. For example: Taking a solid body with base area of 24×90=2200 for example, disassembling it into three-star shaped buildings with included angle of 120°, the size of each small rectangle is 12×62, and each short side is circumscribed with a circle with diameter of 12 m to constitute an integral structure architecturally, then the bending resistance section modulus of the side surface of the former is about 8640 m$^3$, the latter is as high as 68000 m$^3$ and is increased by 7.8 times, therefore the shock strength against the horizontal shock wave is greatly enhanced.

The southwards moving phenomenon of sandification in our country is serious and worrying, the inventor has worked in Beijing for years at the beginning of 1950s, at that time sand trace on car can be seen only several times every year as today's Nanjing (at that time the sand trace was on the clothes); in April of the year before last, we saw the sand storm in Beijing which is said not to be heavy, but we never seen in that time.

Waterlogging phenomenon as well as drought appear in cities and countrysides every year in our country, however the vastly Yangtze river still runs into the sea at the rate of about 10,000 m$^3$/sec, then 300 billion tons of water runs into the sea every year; if the head thereof is lifted by 50 m to send to Beijing, 5 million KW is needed, which is equal to 30~50 open-field power stations of our invention; because of shortage of energy, water operation channels and operation mechanisms, the water cannot be transferred freely; If the water in the river in one year is transferred by wind power into the Gobi Desert, the southwards moving phenomenon of sandification will not be a problem; and so far south-to-north water diversion project only rests on natural slope flowing way. Therefore this problem can be solved by the power station of our invention by installing with a super high power water pump; if human cannot conquer the nature, how about conquer the nature by nature?

SUMMARY OF THE INVENTION

A house architectural complex (Hereinafter refers to as architectural complex) wind-concentrating type wind power hub generating station/power station and an open-field structure group (Hereinafter refers to as structure group) wind-concentrating type wind power hub generating station power station are provided, which use the relation that the power of a wind driven generator is proportional to third power of the wind speed, and use the wind-concentrating structure of our invention and transmission mode principle thereof so as to increase the speed of the natural wind at the speed about 3~8 m/sec with probability above 80% to 50~70 m/sec, then the power of a unit area of the blade will be increased by about 100~340 times; a high-rise architectural complex with areas of 60,000 m$^2$ can provide a wind generation set with the installed capacity of 20,000~50,000 kw if the wind speed thereof is 50 m/sec after collecting wind, and the installed capacity of an open-field structure wind power hub power station can reach 50,000~150,000 kw and a wind driven power station with corresponding powers when the wind speed is set as 70 m/sec. The widely application of our invention will bring clean, permanent and cheap energy for humans and get rid of disasters of wars caused by scrambling for energy, and the cost is greatly reduced compared with the prior art.

The architectural complex wind-concentrating type and an structure group wind-concentrating type wind power hub generating station/power station, wherein: the central part of the architectural complex or the structure group is provided with a high-floor, super high-floor hollow cylindrical central tower 28 which runs through the height of the whole floors; each floor of the tower 28 comprises a hollow cylinder with inner diameter of D and a impeller housing 8 formed by the upper and lower floorboards 7 perpendicular to the cylinder; the center point O of the central tower 28 is provided with a concentrated drive shaft assembly 2 which runs through the height of the whole tower 28, is coaxial with the ground central axis 1 and runs through each floor of the tower 28; in this way the wind torque of the impeller in each floor of the tower 28 is transmit to the lower end (or upper end) of the concentrated drive shaft assembly 2 and then is transmit to the speed increaser, generator or power transmission gear; when a vertical axis impeller is used, the concentrated drive shaft assembly 2 in each floor of the tower is installed with an impeller 3 with height h slightly smaller than the floor headroom height H, the number of the blades is 2 or more; when a horizontal axis impeller is used, each floor of the tower 28 is provided with one set or more horizontal shaft impeller component, the number of layers of blades 22 installed the front end of the impeller shaft 21 of the component is one or more, the back end of the impeller shaft 21 meshes with a conical gear 20 on the concentrated drive shaft 2 via a conical gear 19; the architectural complex wind-concentrating type wind power hub generating station/power station takes the center O of the central tower 28 as the origin, and is radially provided with two or more sub-buildings to constitute two or multiple sub-architectural complexes; the outer wall thereof is connected with the outer wall of the central tower 28 and forms a speed-increasing type windage with a floor 29, a ceiling cover 13 and a ceiling cover supporting truss 14; the structure group wind-concentrating; type wind power hub generating station/power station takes the center O of the central tower 28 as the origin, and is radially stretched and provided with two or more structural towers, both side surfaces of the structural towers are covered with panels 31 and are connected with the central tower 28 and form a speed-increasing type windage with a floor 29, a ceiling cover 13 and a ceiling cover supporting truss 14; Each floor of the central tower (28) of above-mentioned two types of wind-concentrating type wind power hub generating stations/power stations is provided with an entrance ventilation door (6) on the hollow cylinder of each floor of the central tower (28) at the intersecting part of two sub-buildings or two structural towers, thus the architectural complex wind-concentrating type and an structure group wind-concentrating type wind power hub generating station/power station are constituted.

The structure of the ceiling cover supporting truss 14 comprises: multiphase (the outer wall space between two sub-buildings or the outer wall space between the trusses of two structure groups is a phase) fixed type; single-phase rotatable type—which can rotate around O axis 1 toward the direction of the natural wind and can be supported on the upper circular rail 33 and on the supporting truss 34 thereof;

the driving modes thereof comprise: central shaft driving mode and single electric speed reducer driving mode via a traveling wheel 26.

Arrangement modes of the speed increaser and generator on the concentrated drive shaft 2 comprise: series connection, parallel connection, series and parallel connection of one set and more; the arrangement locations of the positions of said speed increaser, generator and power driven device comprise: lower end and upper end of the concentrated drive shaft 2.

Only a single phase needs to be installed on each wind-concentrating type hub generating station/power station and needs to be positioned in the wind direction when a rotatable ceiling cover 13 is adopted.

Shapes of the plan view of the sub-buildings comprise: arc streamline A, rectangle B and stepped rectangle C.

The opening and closing modes of the adjustable entrance ventilation door 6 installed on each floor of the central tower 28 to keep a constant speed of the generator comprise: manual mode, single-floor automatic on-off mode and whole building linkage on-off mode.

Shapes of the blade of the horizontal axis type impeller comprise: double-blade type, multiple-blade type, upper wind direction type, lower wind direction type and sail wing type; patterns of the vertical axis type impeller comprise: S-shape, board wing covered shape, cup-shape, $\Phi$ shape, $\Delta$ shape, board wing straight blade shape, turbo shape, S and $\Phi$ combined shape; the horizontal axis type impeller housing 24 is supported on the circular rail fixed on the floor 7 via the traveling wheel 26; the blade can be a flexibility body and also can be a rigid body.

Types of the speed increaser comprise: parallel axis/coaxial NGW type, coaxial and planocentric gear type; types of the generator 16 comprise: vertical type, horizontal type; tooth profiles of the conical gears 19 and 20 comprise: involute, circular arc, spiral; the tooth profiles of the speed increaser 11 comprises: involute, circular arc, planocentric gear type; types of the generator comprise: coaxial type, parallel axis type.

The power driven loads set by the upper and lower end of the concentrated drive shaft 2 comprise: driving the pump, agricultural intensive processing machinery, gears of industrial processing machinery, belt pulley, chain wheel drive system and heat pump system device.

The output power of the generator can be used for buildings or structures themselves, grid-connected power supply, power transmission and transformation devices of the heat supply system for the buildings and generating station/power station thereof.

Our invention uses the circumferential adjustability of the area of the entrance ventilation door 6, and the radial adjustability and circumferential covering surface adjustability (part or all of which are unloaded when the natural wind is quite strong) of the ceiling cover 13 so as to adjust the wind speed entering into the tower and keep the generator to operate at a constant speed.

The shape of the top view of each structural tower can be trapezoid, isosceles triangular and isosceles internal and external circular arc; the ceiling cover 13 and panel 31 can be rigid bodies and also can be flexibility bodies, the materials can be transparent or opaque.

Principle of Invention:

As known to all, the power W perpendicularly flowing through the blade section F in a unit time is proportional to the third power of the wind speed V, namely $\rho FV^3$ (In the formula, $\rho$ is the air density); the prior conventional wind power generators all adopts natural wind speed, however our invention uses the principle of above formula so that the natural wind forms an integral speed-increasing space after passing through the outer wall of the architectural complex, or outer panel 31 of the structural truss, ceiling cover 13 and speed-increasing windage floor 29; the speed of the natural wind is increased continuously when flowing to the entrance ventilation door 6 of the through the entrance surface of the speed-increasing windage and chord length thereof 36, for example if the chord length 36 of the entrance surface of the speed-increasing windage is 100 m, the chord length of the entrance ventilation door 6 is 10 m, then the speed-increasing ratio of the wind speed is 100:10, namely the wind speed is increased by 10 times (Local resistance is ignored); if the natural wind speed is 5 m/sec, then the wind speed acting on the blade of the impeller of the central tower is 50 m/sec, the power thereof is increased by $10^3=1000$ times compared with the natural wind with the same blade area. Our invention can adjust the wind speed entering the tower by using the circumferential adjustability of the windage exit area and adjustability of the circumferential and radial covering surface of the ceiling cover 13 (part or all of which are unloaded when the natural wind is quite strong) so as to keep the generator to rotate at a constant speed.

Advantages of Invention

1. The scope of conventional wind energy resources is enlarged; as the speed increasing effect of our invention, the conventionally adopted wind energy resource 6~8 msec is reduced to about 3 m/sec, so vast regions have available wind energy resources.

2. The natural wind generator with non-adjustable rotation speed is converted to an adjustable constant-speed wind turbine generator.

3. As the constant speed wind turbine generator is created which creates advantageous conditions for grid connection, the difficulty of grid connection of the conventional wind turbine generator is overcome.

4. The distance between users is shortened and the costs of power transmission equipments are greatly reduced.

5. Our invention can directly provide power supply, heat source, cold source and power source to the residences, offices, industrial housings, commercial housings and surrounding buildings in our invention.

6. As the rotation speed of the turbine is increased from 30 r.p.m of the conventional wind turbine to 200~300 r.p.m, so the drive torque is reduced by 5~10 times, the cost of the transmission gear is reduced by 5~10 times, and the processing difficulty of the transmission gear of the large wind power generator is greatly reduced.

7. As the concentrated transmission is adopted, the land area and administrative expenses are greatly saved.

8. The power of a single generator unit is promoted from 2000 KW to 20,000 KW, even 5~10 KW/set.

9. It is possible to replace petroleum, coal and natural gas with our invention after the petroleum, coal and natural gas are exhausted.

Take the power supply in Beijing in 2007 for example: provided that the power supply capacity per capita is 0.84 KW (It was reported by radio broadcast on 30 Nov. 2007 that the total power supply capacity is 8.37 million KW, provided there are 10 million people, then the power supply capacity per capita is 0.84 KW), and the building per capita is 20 m$^2$, then 60000 m$^2$ power station buildings can provide the power supply capacity of 3000 people, however the capacity for itself only needs 3000×0.84=2520 KW, the rest part can be used for external supply; provided that a 20000 KW generator normally operates 6000 hours every year, then electric energy production is 120 million degrees, provided that the price is 0.5 yuan/degree, then the yearly gross profit is about 60 million yuan. For an open-field wind power station, the natural wind speed is 8 m/sec, the speed increasing ratio is 9, then the outlet velocity thereof is about 70 msec, when the diameter of the rotor thereof is 16 m, the height of a single floor is 4 m, then the power of a single floor can be as high as about 5000 KW; provided there are 30 floors (the total effective height is 120 m), then the total installed capacity can be as high as 150,000 KW; therefore for architectural complex, the outlet wind speed of our invention is preferably 50 m/sec; for the open-field wind power station, the outlet wind speed is preferably 70 m/sec; this is the same as the speed increase of the train, the speed thereof can be increased with the improvement of technology.

The invention can increase the wind speed of the architectural complex type wind power station from light breeze at 3 m/sec to 50 m/sec (the speed increasing ratios is 16, inland type) without breaking the building design specifications, while the wind speed of the open-field wind-concentrating power station can be increased from natural wind resource (8 m/sec) to 70 msec; as the generation power of the wind turbine is proportional to the third power of the wind speed (same as above-mentioned book P 178), compared with prior three-bladed horizontal axis impeller natural wind speed generating station (the ideal natural wind speed is fresh breeze 8~10 m/sec, which takes 20% of the yearly probability), taking the sane 10 m/sec natural wind for example, the generation powers of the unit blade frontal area of our invention are increased by 125 times and 343 times; when the heights of the towers are approximately the same (about 100 m), our invention can obtain an frontal area of ~800 m$^2$ when the diameter of the blade is 18 m, however for the 2000 KW device in the prior art, when the diameter of the blade is 60 m, only about 100 m$^2$ frontal area can be obtained; therefore the architectural complex wind power station of our invention is preferably 10,000~50,000 KW, while the open-field type hub units can be as high as 50,000~150,000 KW.

The ceiling cover 13 of the architectural complex wind power generating station and the ceiling cover 13 of the open-field wind power generating station also can adopt partially radial or circumferential open-type structures to reach the purpose of unloading with a single drive system by opening and closing the wire cable, and also the speed of the wind turbine can be closed or adjusted by closing or adjusting the entrance ventilation door 6 in the trapezoid cubical space.

The invention can be unloaded by partially opening the ceiling cover 13 when necessary, such uninstall movements comprise: manual, single maneuvering and concentrated maneuvering; the transmission modes thereof comprise: directly transmission by an electric speed reducer, transmission by an electric speed reducer via a chain wheel or a wire cable; when the direction of the natural wind is parallel to the radial central axis of the building pr structural tower, wind-concentrating wing 25 of the limiting device are provided at each tip part of the outermost part of the plan of the building or tower; the wind-concentrating wing 25 comprises a vertical shaft between the floor and the ceiling cover 13 and corresponding folded wing; the folded wing clings closely on the side wall at ordinary times, the folded wing open an angle to collect wind when meeting above-mentioned wind and is positioned by the limiting device (such as ratchet wheel); the drive modes for the folded wings and vertical shaft comprise: wire cable transmission, single transmission with a motor reducer, compressed air transmission and hydraulic transmission.

DESCRIPTION OF THE DRAWINGS

A in the figure represents the external streamline wall buildings.

B in the figure represents the rectangular exterior wall buildings; C represents the outer stage rectangle exterior wall buildings.

In the figure: H is the height of the floor; h is the length of the blade of a single floor; D is the inner diameter of the housing; d is the outer diameter of the blade.

$d_1$ in the figure is the maximum rotation diameter.

Wherein: J-K section is a front view of the partial section, and the figure below is a top view thereof.

Figure 1:
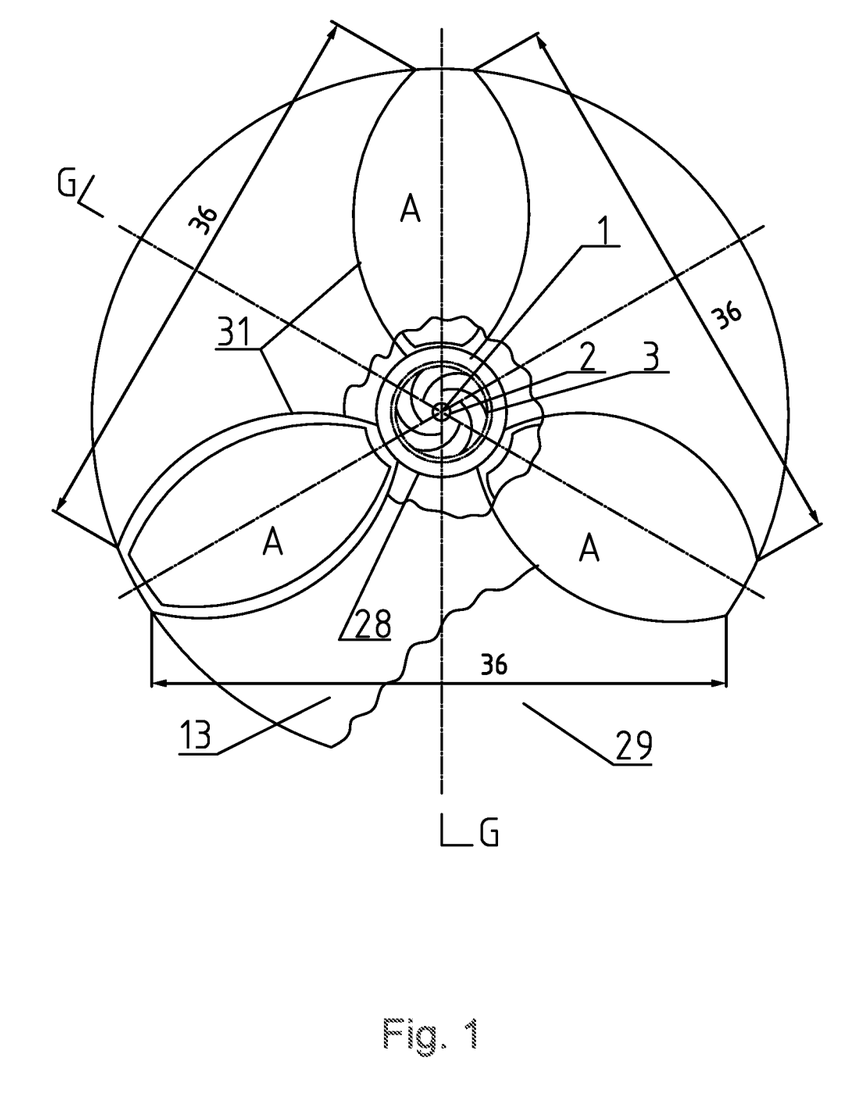
FIG. 1 is a top view of the three-petal streamline shaped architectural complex wind-concentrating wind power generating station.
Figure 2:
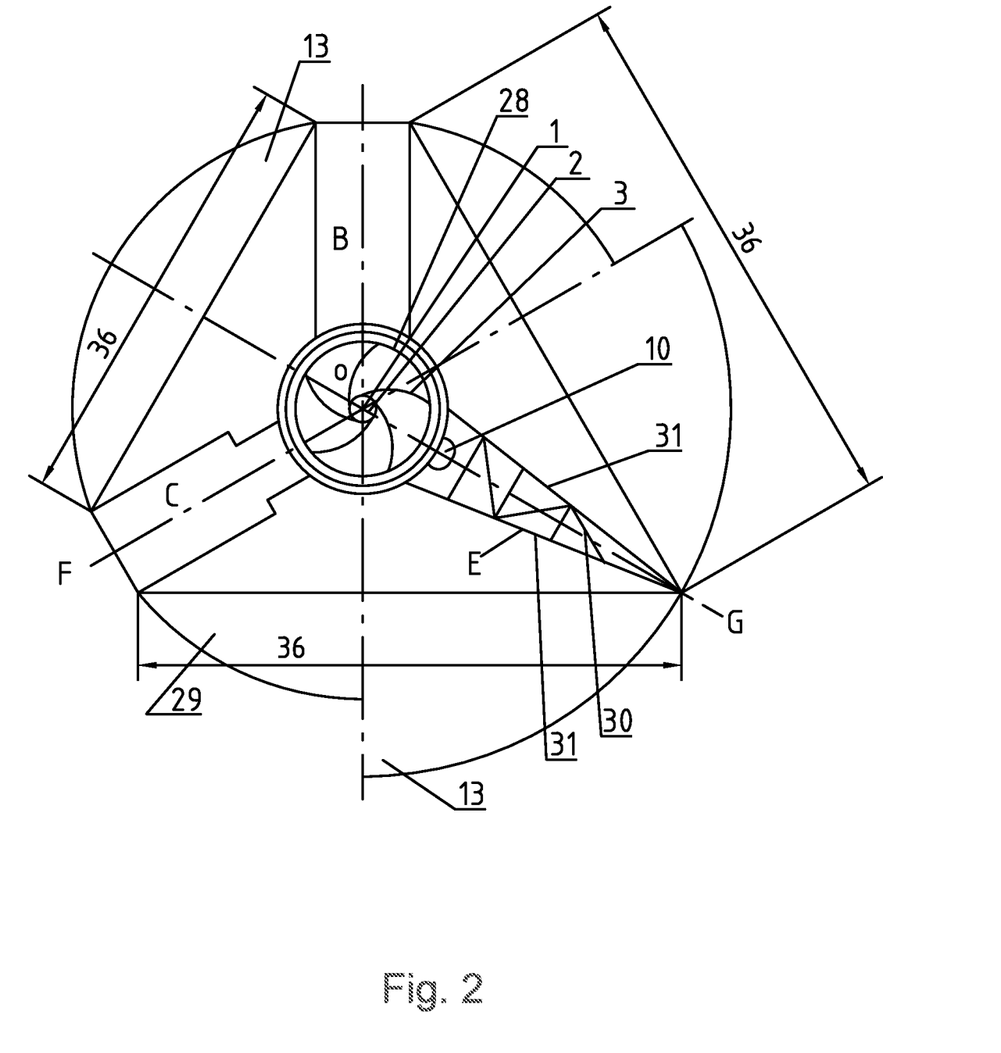
FIG. 2 is a top view of the three-petal type rectangular, multistage rectangle and triangular architectural complex or open-field structure (namely consisting of tower) wind-concentrating generating station.
Figure 3:
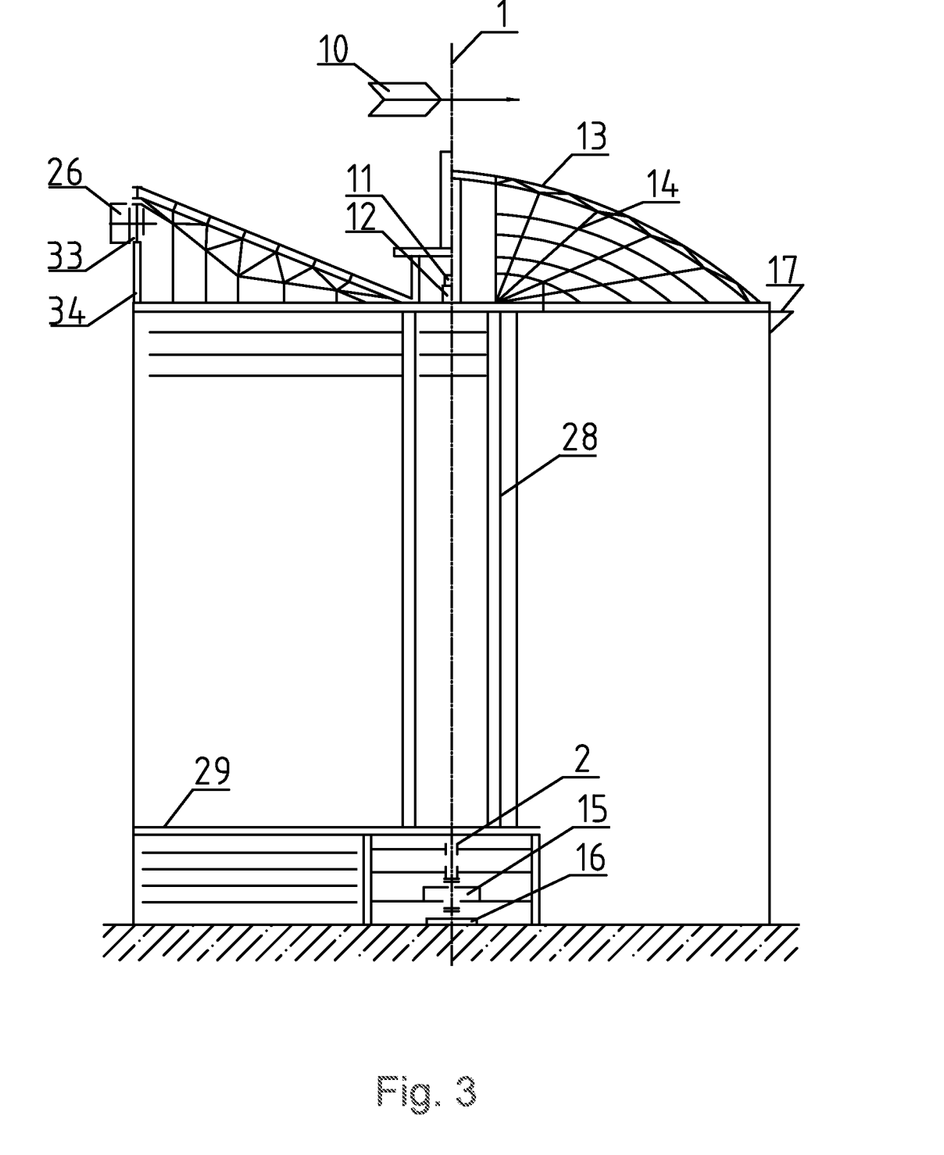
FIG. 3 is a sectional view of GOG in FIG. 1.
Figure 4:
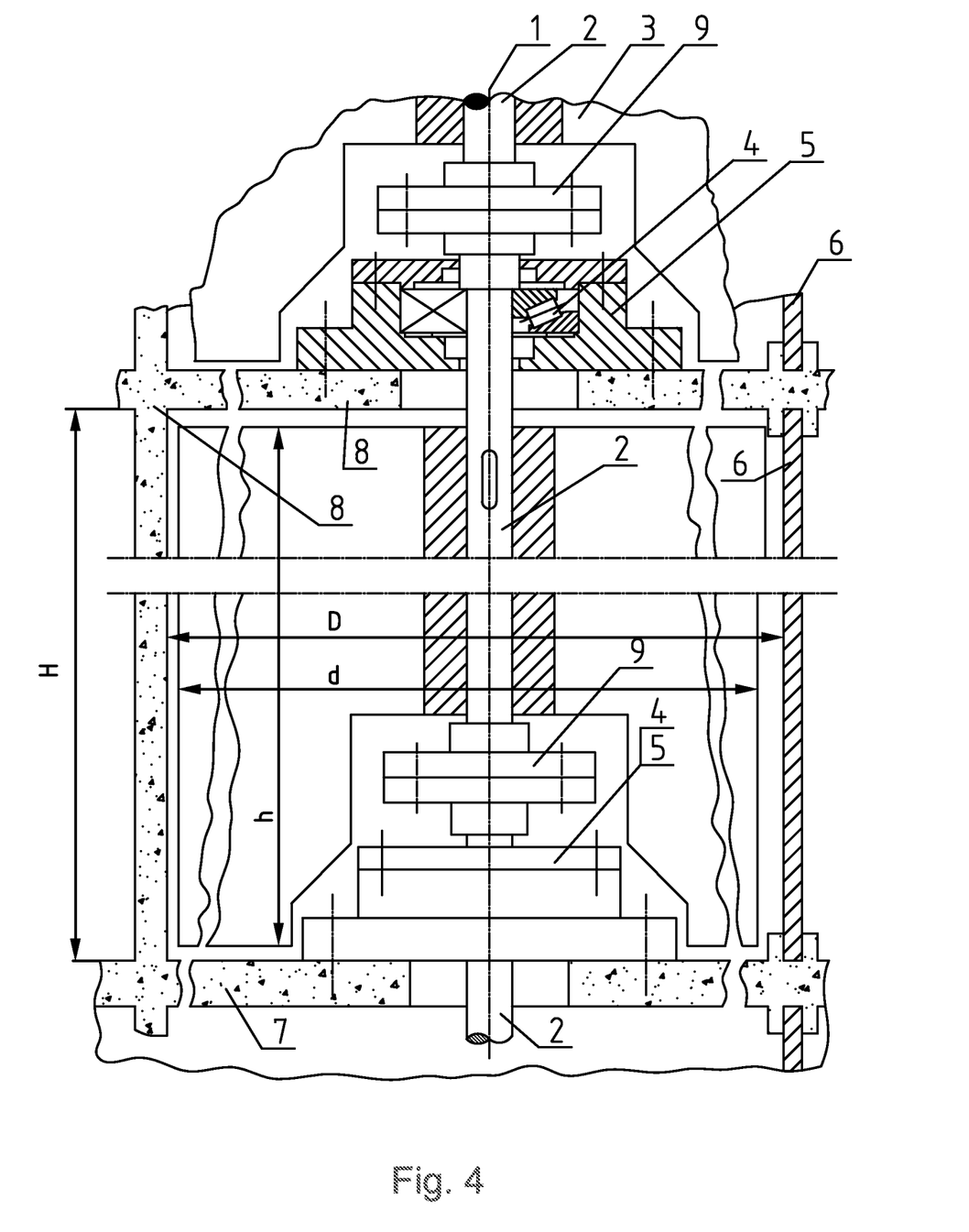
FIG. 4 is a system diagram of the S impeller component of the single floor in the vertical axis type impeller system in the central tower 28.
Figure 5:
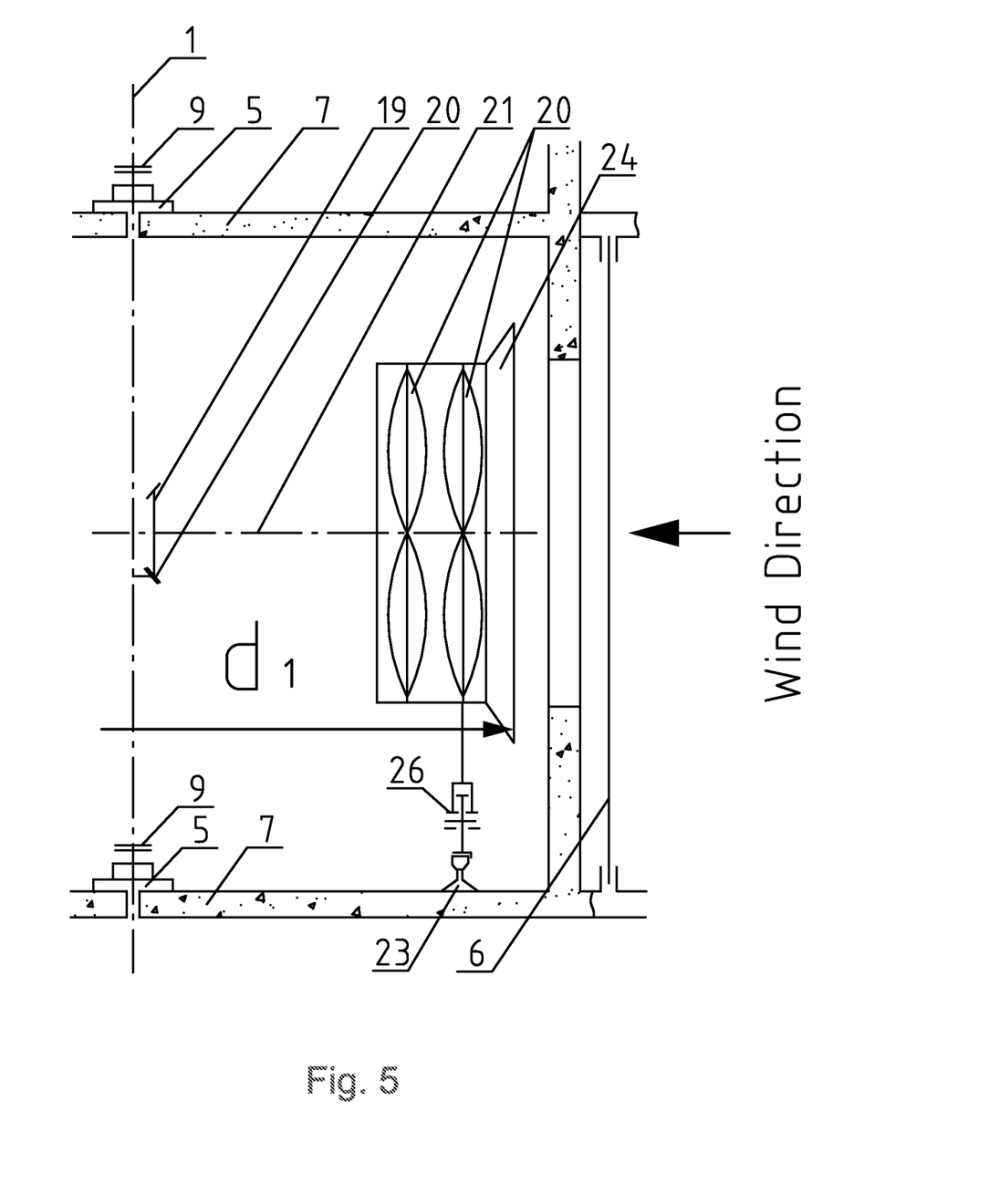
FIG. 5 is a drive system diagram of the horizontal axis type impeller component in the tower with a single floor.
Figure 6:
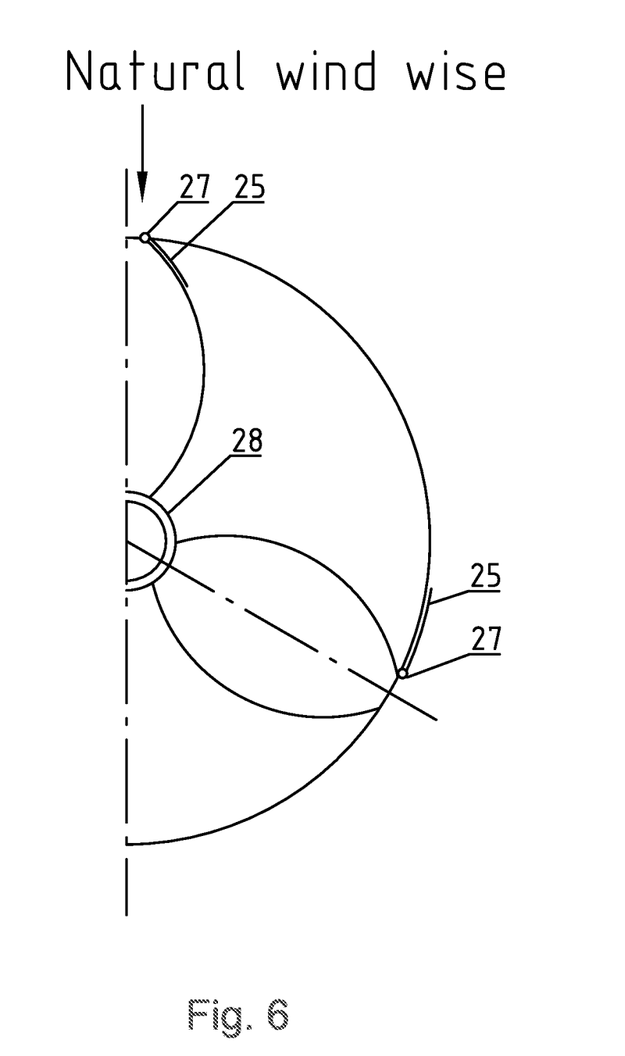
FIG. 6 is a top view of the building with wind-concentrating wings.
Figure 7:
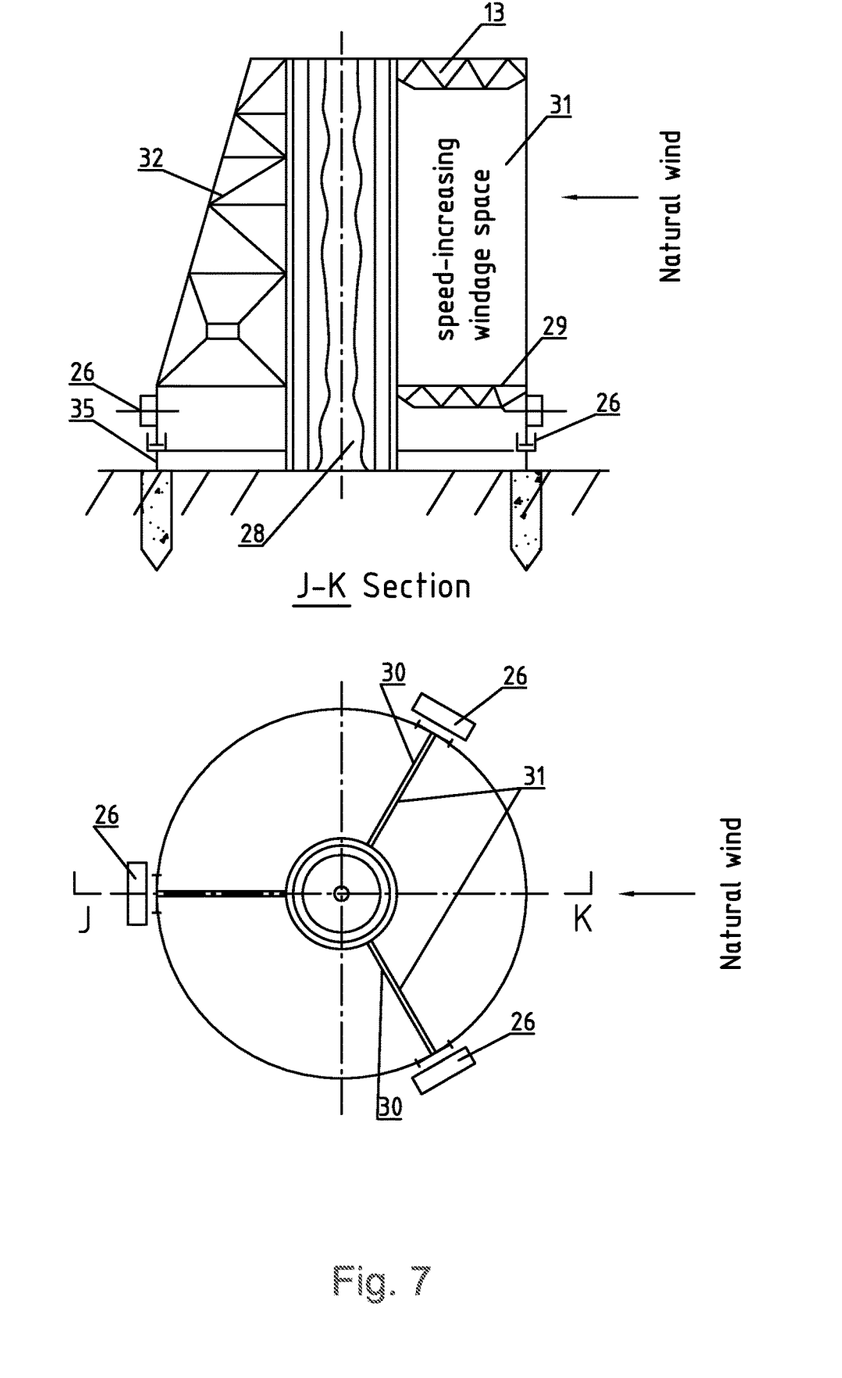
FIG. 7 is an external structure diagram of the open-field rotating-tower type hub wind power generating station (The facilities in the central tower 28 are the same as the fixed type).

1. Central axis
2. Concentrated drive shaft
3. Impeller
4. Bearing
5. Bearing block
6. Entrance ventilation door
7. Floor
8. Impeller housing
9. Coupling
10. Lift
11. Vertical motor with an independent power source
12. Speed-reducing, wire cable coiling device
13. Ceiling cover
14. Ceiling truss
15. Speed increaser
16. Generator
17. High-tension cable cantilever shalving
18. Natural wind wise indicator
19. Bevel gear
20. Bevel gear
21. Horizontal impeller shaft
22. Blade
23. Annular guide rail on the tower floor 7
24. Horizontal impeller housing
25. wind-concentrating wing
26. Free traveling wheel or active traveling wheel of driving motor and speed reducer
27. Hinge shaft
28. Central tower
29. Speed-increasing windage floor
30. Steel structure truss for attracting wind 31. Panel
32. Auxiliary supporting truss
33. Upper round rail
34. Supporting truss below the upper round rail
35. Round rail on the ground
36. Entrance surface of the speed-increasing windage and chord length thereof.

DETAILED DESCRIPTION OF PREFERRED EMBODIMENTS

The preferred embodiment of the invention is described in detail as follows with combination of attached figures: the sub-buildings of the architectural complex wind-concentrating hub generating station and the star-shaped wind-attracting tower of the open-field structure wind-concentrating hub generating station are preferably arranged in a plane layout of three parts with 120° angles; according to the features of the wind direction of each region, the direction positioning of above-mentioned buildings and structures is carried out in a way of being parallel to the central line of a certain sub-building or a certain planetary tower to get the largest wind-attracting effect; the wind speed increasing ratio of the buildings and structures of our invention is determined according to the basic wind pressure of each region, in recent 20 years, the wind speed at the entrance of the impeller of the architectural complex wind-concentrating wind power generating station is preferred as 50 m/sec, the installed capacity about 20,000~50,000 KW is preferred; the wind speed at the entrance of the impeller of the open-field wind-concentrating generating station is preferred as 70 m/sec, the installed capacity about 50,000~150,000 KW is preferred. With the progress on technology and time lapse, above-mentioned wind speed at the entrance still has a large increasing space; the architectural complex wind-concentrating generating station above 6 floors to 30~40 floors is preferred; S shape is the simplest one of the vertical axis impellers, the double-layer and multiple blades of the horizontal axis impeller are preferred; the open-field wind power generating station above 50,000 KW is preferably provided with a pressurization substation, the tower thereof is preferred to be also used as a power transmission and distribution tower. The generating station should be provided with effective lightning arresters, safe high-altitude walking rails and effective silencers; the buildings of our invention should be provided with closed exterior walls so as to enhance the speed increasing effect of the windage. The embodiments of the invention also can contain various healthy and beautiful designs in the aspect of architecture excluding the characteristics in structure, thus wind power hub generating station, wind power hub power station and architectural complex with Chinese culture characteristics and modernization connotation are constructed.

What is claimed is:

1. A wind power station with wind concentrating structure comprising:
   a wind concentrating structure, which includes a multiple of floors and a hollow cylindrical central tower (28) running through the multiple of floors;
   each floor of the central tower (28) comprises a hollow cylinder with an inner diameter of D, an impeller housing (8) formed by upper and lower floor boards (7) which are perpendicular to the hollow cylinder;
   a concentrated drive shaft assembly (2) is provided at a center point O of the central tower (28) being coaxial with a ground central axis (1) and running through each floor of the central tower (28);
   an impeller is installed on the concentrated drive shaft assembly (2) in each floor of the central tower, wherein the impeller is elected from a vertical axis impeller and a horizontal axis impeller; the vertical axis impeller (3) has a height h slightly smaller than a headroom height H of the floor, the impeller (3) has a multiple of blades; the horizontal axis impeller is provided with a horizontal shaft impeller component to connect with the concentrated drive shaft assemble (2) via a pair of conical gears (19, 20);
   a structure of speed-increasing type windage is elected from following first and second structures:
   the first structure includes a multiple of sub-buildings being radially provided from an original point which is a center O of the central tower (28), outer walls of the sub-buildings being connected with an outer all of the central tower (28), the multiple of floors, a ceiling cover (13) and a ceiling cover supporting truss (14);
   the second structure includes a multiple of structural towers being radially stretched and provided from an original point which is a center O of the central tower (28), bath side surfaces of the multiple of structural towers being covered with panels (31) which are connected with the central tower (28), the multiple floors, a ceiling cover (13) and a ceiling cover supporting truss (14);
   each floor of the central tower (28) has a multiple of entrance ventilation doors (6) on the hollow cylinder, each entrance ventilation door (6) is between two interfacing sub-buildings or two interfacing structural towers;
   the ceiling cover supporting truss (14) is a single-phase rotatable type, which is rotatable around the ground central axis (1) toward a direction of natural wind and is supported on an upper circular rail (33), driving modes thereof comprise a central shaft driving mode and a single electric speed reducer driving mode via a traveling wheel (26).

2. The wind power station with wind concentrating structure according to claim 1, wherein a speed increaser and a generator are connected with the concentrated drive shaft (2), the speed increaser, generator are installed at lower end or upper end of the concentrated drive shaft assembly (2).

3. The wind power station with wind concentrating structure according to claim 1, wherein the sub-buildings having a plan views selected from the group of a streamline shape, rectangle shape and a stepped rectangle shape.

4. The wind power station with wind concentrating structure according to claim 1, wherein the entrance ventilation door (6) is of a manual mode, a single-floor automatic on-off mode or a whole building linkage on-off mode.

5. The wind power station with wind concentrating structure according to claim 1, wherein a horizontal axis impeller housing (24) is supported on a circular rail fixed on the floor (7) via a traveling wheel (26); the blade is a flexibility body or a rigid body.

6. The wind power station with wind concentrating structure according to claim 1, wherein power driven loads by the upper and lower end of the concentrated drive shaft (2) are of driving pumps, agricultural intensive processing machineries, gears of industrial processing machinery, belt pulleys, chain wheel drive systems and heat pump system devices.

* * * * *